United States Patent

Gaiser

[11] Patent Number: 5,846,494
[45] Date of Patent: *Dec. 8, 1998

[54] REACTOR FOR CATALYTICALLY PROCESSING GASEOUS FLUIDS

[76] Inventor: Gerd Gaiser, Lang Äcker 4 18, D-72768 Reutlingen-Rommelsbach, Germany

[*] Notice: The term of this patent shall not extend beyond the expiration date of Pat. No. 5,700,434.

[21] Appl. No.: 868,855

[22] Filed: Jun. 4, 1997

Related U.S. Application Data

[63] Continuation-in-part of Ser. No. 325,252, filed as PCT/EP93/00995, Apr. 24, 1993, Pat. No. 5,700,434.

[30] Foreign Application Priority Data

Apr. 30, 1992 [DE] Germany .......................... 42 14 579.1

[51] Int. Cl.⁶ ....................................................... F01N 3/10
[52] U.S. Cl. ........................ 422/173; 422/171; 422/175; 422/177; 422/180; 422/198; 422/200; 422/206; 422/211; 422/222; 165/166; 165/167
[58] Field of Search ................................. 422/171, 173, 422/177, 180, 191, 198, 200, 201, 211, 222; 60/299, 300, 320; 165/165–167

[56] References Cited

U.S. PATENT DOCUMENTS

| | | | |
|---|---|---|---|
| 2,778,610 | 1/1957 | Bruegger et al. ........................ 422/201 |
| 3,910,042 | 10/1975 | Yuge et al. ............................... 422/173 |
| 3,925,252 | 12/1975 | Yabuta et al. ........................... 422/173 |
| 3,972,685 | 8/1976 | Hanaoka ..................................... 60/299 |
| 4,017,953 | 4/1977 | Creighton ................................ 165/167 |
| 4,867,949 | 9/1989 | Betz ......................................... 422/171 |
| 5,118,477 | 6/1992 | Takikawa et al. ...................... 422/180 |
| 5,303,547 | 4/1994 | Mieville et al. ........................ 422/173 |
| 5,700,434 | 12/1997 | Gaiser ..................................... 422/173 |

FOREIGN PATENT DOCUMENTS

| | | |
|---|---|---|
| 838601 | 5/1952 | Germany . |
| 2838093 | 3/1979 | Germany . |
| 8435297 | 3/1985 | Germany . |
| 1474076 | 5/1977 | United Kingdom . |

*Primary Examiner*—Hien Tran
*Attorney, Agent, or Firm*—Anderson, Kill & Olick, P.C.

[57] ABSTRACT

A reactor for catalytically processing gaseous fluids including fluid-path forming elements spaced from each other and forming a plurality of adjacent first and second channels through which fluid flows in opposite directions, with each of the first and second channels having an inlet region and an outlet region where at least the inlet region of the first channel and the outlet region of the second channel are without a catalyst and where each of the first and second channels have one region other than its inlet and outlet regions provided with a catalyst, with the inlet region of the first channel and the outlet region of the second channel providing for heat exchange between the first and second channels.

13 Claims, 6 Drawing Sheets

REACTOR FOR CATALYTICALLY PROCESSING GASEOUS FLUIDS

RELATED APPLICATIONS

This is a continuation-in-part application of application Ser. No. 08/325,252, filed Oct. 20, 1994 for "Reactor For Catalytically Processing Gaseous Fluids", now U.S. Pat. No. 5,700,434 which is a 371 of PCT/EP93/00995 filed Apr. 24, 1993.

BACKGROUND OF THE INVENTION

1. Field of the Invention

The invention relates to a reactor for catalytically processing gaseous fluids in which, along with a catalytic reaction, a heat exchange takes place.

2. Description of the Prior Art

The use of catalysts for purification of outgoing air, e.g., of a solvent-containing industrial air and air used in technical synthesis, is known. The outgoing air is conducted through a reactor in which a catalyst is provided. It is typical for a catalytic oxidation that, on one side, the processed fluid is heated to a predetermined temperature so that a catalytic reaction can take place and that, on the other hand, during a catalytic reaction, heat is released by an exothermal reaction. As a result, it is necessary to evacuate the released heat to avoid overheating and destruction of the catalyst and to supply heat, especially at the beginning of the reaction. To this end, it has already become known to provide outgoing air reactors in which the flow direction is periodically changed.

With a high technical output, a particular drawback of conventional reactors consists in that, during the change of the flow direction, the air which remains in the former inlet is discharged without being purified. It was also suggested to conduct catalytic purification of the outgoing air in a rotatable catalyzer. At that, the stream of outgoing air due to the rotational movement of the catalyzer, flows through the catalyzer interchangeably radially or axially. However, the use of rotatable parts presents problems from the sealing point of view and, in addition, the change of the flow direction results in the creation of so-called dead volume of non-purified air.

Accordingly, an object of the present invention is a reactor of the above-mentioned type that would enable a continuous operation without a forced change of the flow direction.

SUMMARY OF THE INVENTION

According to the present invention, this and other objects of the present invention, which will become apparent hereinafter, are achieved by so arranging the fluid path-defining elements in the reactor housing that channel-shaped structures, having sectionally arranged catalytically acting regions, are formed. It has been found out that with such an arrangement, different temperature zones can be obtained at the same flow direction of the fluid. It is exactly this distribution of the temperature zones is desirable or required for catalytic purification of the outgoing gases.

It was proved to be especially advantageous when the structures have a non-flat outer surface, e.g., a corrugated outer surface. The corrugated structure of plates provides for forming flow channels between respective plates with a very high local heat and mass transfer at the plates. Furthermore, providing a reactor with a plurality of fluid channels which are formed by corrugated plates and which extend substantially parallel to each other, permitted to achieve a very large heat transfer area per unit volume of the reactor. This effect is advantageously used when, according to the invention, the outgoing air flows through two adjacent channels in accordance with a counterflow principle.

To this end, the fluid flow is divided so that fluid flows in the same direction only in every other channel. Thereby, it is achieved that in the first corrugated plate region, which does not have a catalyst, the heat from air, which has already passed the catalyst and which was heated by an exothermal reaction, is transferred to this plate region and the air, which has yet to be subjected to the catalytic treatment and which flows in the adjacent channel, is preheated due to heat transfer. In the second corrugated plate region, which likewise does not have a catalyst, the same heat transfer takes place, but in the opposite direction.

In accordance with a further development of the invention, it is contemplated that fluid flows through two respective, connected with each other, adjacent channels, so that the reaction heat which is generated in a fluid stream, can be transferred to the same stream for preheating. Instead of being sealed, the channels can end in a common collecting channel, with branching therefrom into respective adjacent channels. Such flow configuration results in that the fluid is compulsorily delivered to the reactor at the same pressure.

In an advantageous embodiment of the invention, it is contemplated to provide in the collecting channel a device for extracting and/or addition of heat. Thereby, the thermal content can alternatively be regulated in accordance with the course of the reaction strong exothermal or less than strong exothermal. By an appropriate shaping of the plate's outer surface, a very high heat and mass transfer between the fluid and the wall is achieved, as well as a predetermined uniform dwell time and a homogeneous mixing in the fluid phase.

The shape of the plate's outer surface, in view of the very high heat transfer, is based upon the fact that, for example, during the catalytic purification of solvent-containing outgoing air, the concentration of harmful material is low and is further reduced by catalysis-generated heat. As a result, a small temperature difference exists between the incoming air and the outgoing air. This leads to a relatively little heating of the air during the reaction and, therefore, to a small temperature difference between the purified air after the reaction and the non-purified air before the reaction. In order to bring the air, which is admitted into the reactor, to a reaction temperature, the relatively small quantity of heat, which is contained in the outgoing air at small concentration of solvents, should be transferred to the incoming air as completely as possible.

In accordance with the invention, with the above-described autothermal reactor types, the use of strong exothermal or strong endothermal reactions requires a uniform heat addition or heat extraction because, otherwise, the catalyst is destroyed or, when endothermal reaction takes place, quenching of the reaction takes place. Further, according to the invention, additional heating and/or cooling channels are contemplated in addition to the already described fluid path-defining structures. These are advantageously provided between two respective fluid paths.

The constructional forms are adapted to particular requirements, e.g., for autothermal operation, the outer surfaces of the heat receiving and heat releasing zones can, for a different heat and mass transfer, be layed out as a reaction zone.

According to a further advantageous embodiment of the invention, it is contemplated to displace the described plates relative to each other so that adjacent plates form contacting each other opposite wave-shaped structures. The wave-shaped structures can have different height dimensions and can be spaced from each other a different distance.

It can also be very advantageous to use plates having opposite orientation so that the plates support each other. With this construction, the best results are achieved. The possible adaptation of the fluid-path defining structures to particular operational requirements permits to so change the temperature profile of the reactor and to shift the functional zones of the reactor, that both the temperature profile and the functional zones would correspond to different load conditions of the reactor.

BRIEF DESCRIPTION OF THE DRAWINGS

The objects and features of the present invention will become more apparent and the invention itself will be best understood from the following detailed description of the preferred embodiment when read with reference to the accompanying drawings, wherein.

DETAILED DESCRIPTION OF THE PREFERRED EMBODIMENTS

Figure 1:
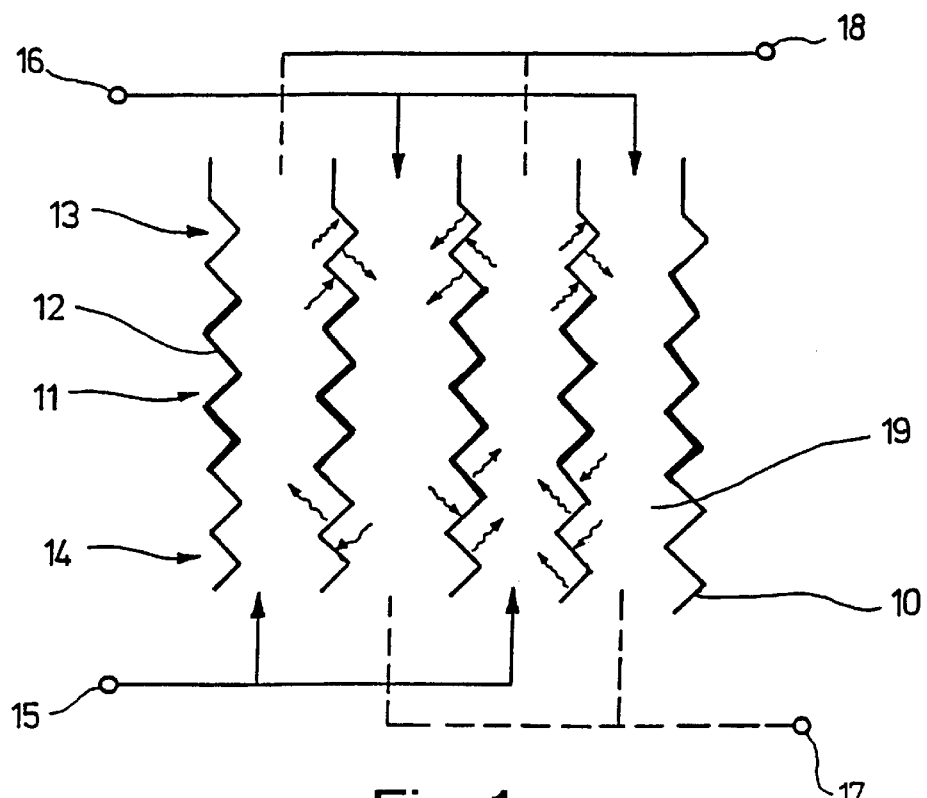
FIG. 1 is a schematic view of a single-path reactor according to the present invention.

FIG. 1 shows an embodiment of a reactor for catalytic processing of gaseous fluids according to the present invention. For the sake of clarity, here and in further figures, the reaction housing is not shown.

A plurality of plates 10, which have a corrugated structure, are arranged parallel to each other and define a plurality of channels 19. Each of the plates 10 have a region 11 in which the opposite sides of each plate are provided with a catalyst 12, e.g., have a catalytic layer formed by coating. In addition, the plates 10 have regions 13 and 14, which are not provided with the catalyst, that is, they do not have any catalyst coating. For delivering fluid, an inlet 15 and an inlet 16 and, for carrying away the products of the reaction, an outlet 17 and an outlet 18 are provided.

The reactor functions as follows:

The fluid, which is delivered through the inlet 15, is so divided that it flows in the same direction only through every other channel 19. The fluid, which is delivered through the inlet 16, likewise flows through every other channel 19. Thus, a counterflow is provided in two adjacent channels 19. When the fluid passes through the region 11 provided, for example, covered with a catalyst 12, a catalytic reaction takes place. During this reaction, the heat is released which is transferred to the fluid. When the fluid then passes through the region 13, the heat is transferred to the plates 10. When a non-processed and, thus, cold fluid flows in the adjacent channel 19, it takes up the heat. So pre-heated fluid enters the reaction zone of its channel 19 and there it is catalytically processed. Due to the exothermal reaction, the fluid is heated further and then gives up the heat to the plates 10 in the region 14.

Because of the counterflow of fluid in channels 19, an autothermal process takes place. Thus, each flow channel has regions with different functions. In the first portion the fluid is heated up, the fluid reacts in a middle portion and, in a third portion, gives up heat to a fluid in the adjacent channels. Thereby, it is insured that the fluid is preheated to a respective pre-reaction temperature. At the first activation of the reactor, an additional, single time, preheating of the fluid may be required. The heat flow in the plates can be changed and thereby influenced by selection of the plate thickness, plate material, and the configuration of the outer surface of a plate.

Figure 2:
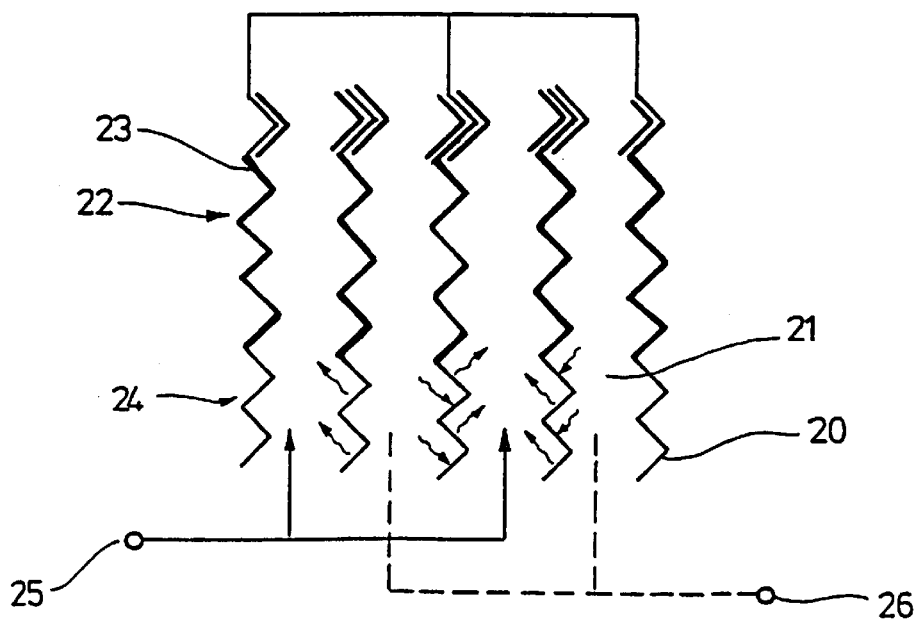
FIG. 2 is a schematic view of a double-path reactor according to the present invention.

FIG. 2 shows another embodiment of the reactor. Here, likewise several plates 20, having corrugated structure, are arranged parallel to each other and form channels 21. The plates 20 have a region 22, with the opposite sides of the plates 20 being provided, e.g., coated with the catalyst, and a region 24 with no coating. The reactor shown in FIG. 2 differs from that of FIG. 1 in that one of its end regions, e.g., region 23, corresponding to the region 13 of the reactor shown in FIG. 1, is also covered with a catalyst, i.e., has a catalyst layer.

Two respective non-adjacent plates 20 are connected with each other so that two adjacent channels 21 define a coherent bent reaction space. The reactor has an inlet 25 for the fluid and an outlet 26 for the products.

The reactor functions as follows:

The fluid is delivered to the reactor through the inlet 25 and is divided so that it flows in every other channel 21. In the regions 22 and 23 of the plates 20, a catalytic reaction takes place. This reaction takes place during flow of fluid in both directions, up and down. The fluid, which was heated by the exothermal reaction, gives up heat to the plates 20 in the region 24 when flowing downward. The heat, which was released in the region 24 is transferred to the upwardly flowing fluid in the adjacent channel 21, whereby this fluid is pre-heated to a desired pre-reaction temperature.

Figure 3:
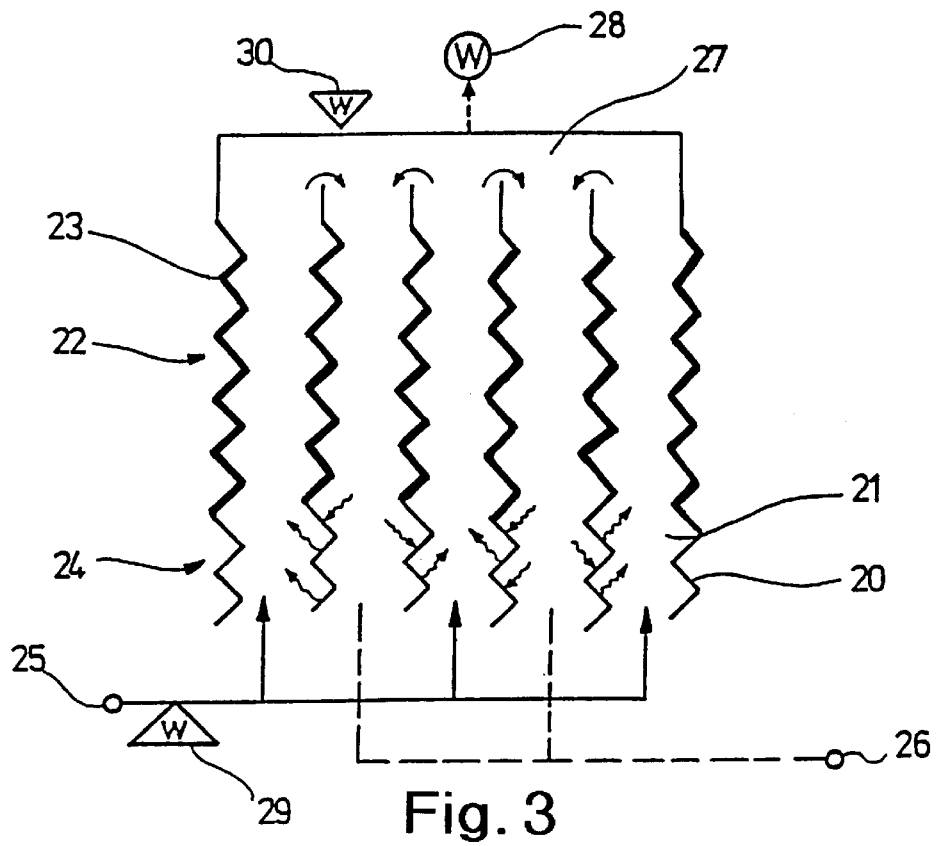
FIG. 3 is a schematic view of a double-path reactor with a collecting channel according to the present invention.

FIG. 3 shows a further embodiment of the reactor. This reactor, contrary to that shown in FIG. 2, instead of the connection of two non-adjacent plates 20, has a collecting channel 27. The channels 21 open into this collection channel, whereby the fluid can flow back through different channels.

In the embodiment shown here, an offtake 28 is provided in the collecting channel 27 for conducting heat energy away. Thereby, it is possible to carry away an excessive heat energy generated during strong exothermal catalytic reaction. However, the heat carrying away is effected so that a sufficiently large amount of the heat energy remains for heating of the plates 20 in the region 24.

In addition, two external pre-heating devices 29 and 30 are provided. These pre-heating devices are necessary for an initial activation of the reactor for pre-heating the fluid to the required reaction temperature. To this end, alternatively, the pre-heating device 29 is provided at the fluid inlet, and the pre-heating device 30 is provided in the collecting channel 27.

The above-described embodiment examples are layed out for an autothermal operation.

Figure 4:
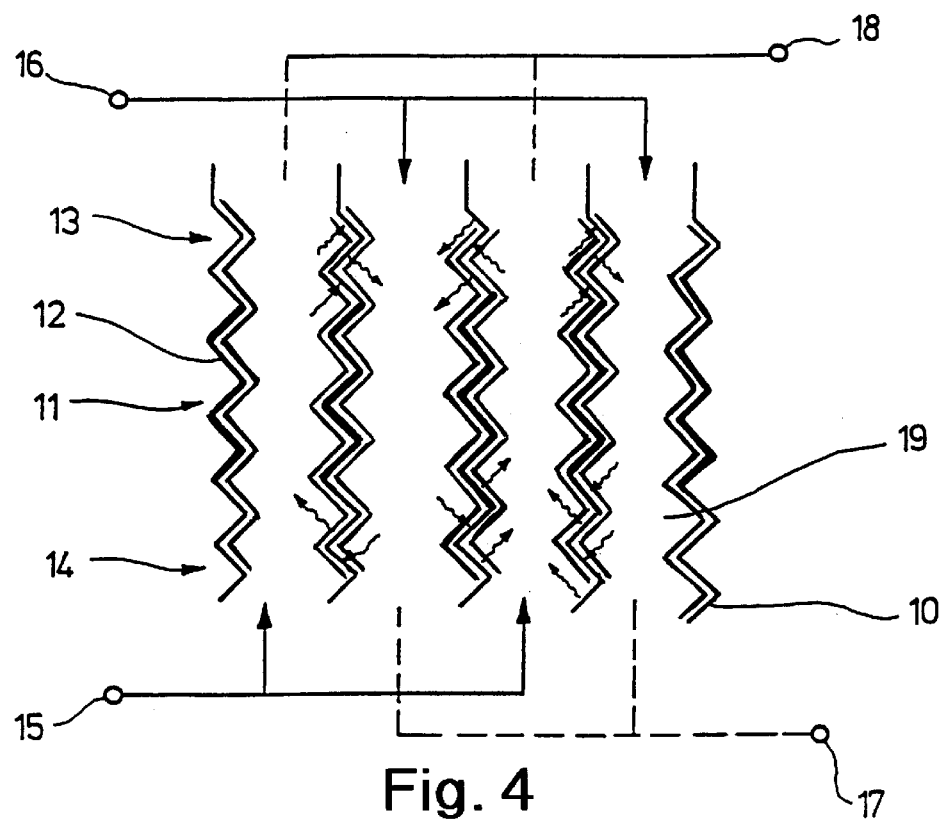
FIG. 4 is a schematic view of another embodiment of a single-path reactor according to the present invention.

FIG. 4 shows a further embodiment of a reactor according to the present invention in which the regions 11 have each two subregions 12' and 13' having catalyst layers formed of different catalysts, which layers may have different thicknesses, thereby regions with different functions can be obtained. The regions 14' of plates 10' are free from catalyst.

Figure 5:
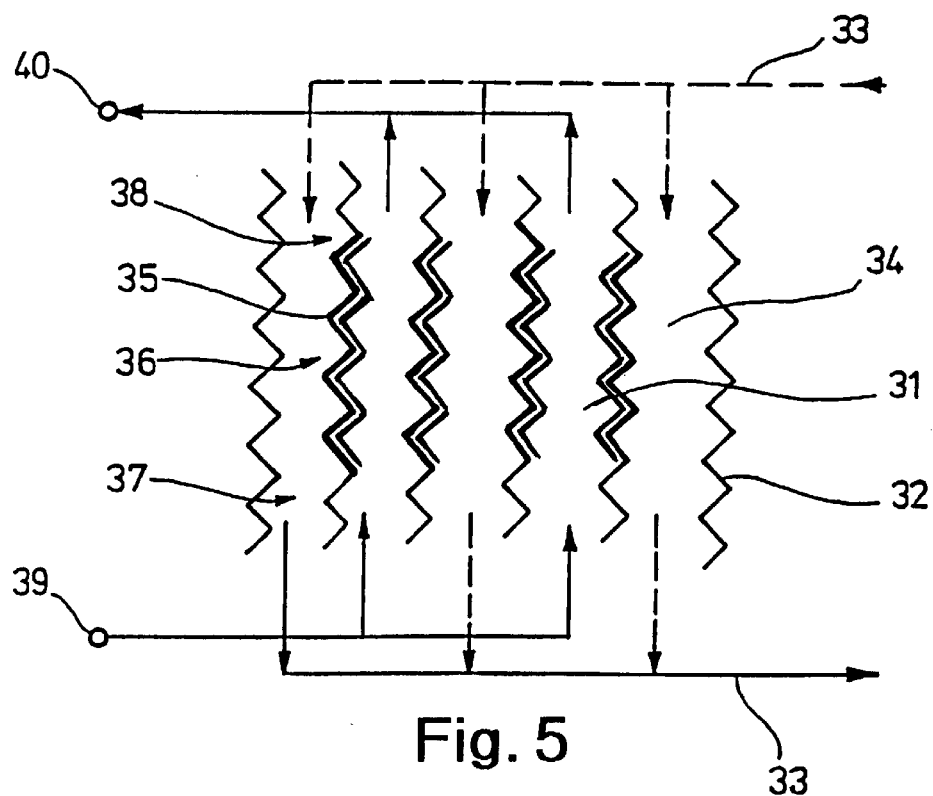
FIG. 5 is a schematic view of a reactor with additional heating and cooling channels according to the present invention.

FIG. 5 shows yet another embodiment of the present invention, which can be used at both strong exothermal and endothermal reactions.

The reactor shown in FIG. 5 can, in addition, be used for heating and cooling purposes. In this reactor, channels 34, which are formed by pairs of respective plates 32 defining a reaction space 31, form part of a cooling or heating circuit 33. All of the plates 32, except the end ones, have a region 36 coated with a catalyst 35, and lower and upper regions 37 and 38, which are not coated.

The plates 32 are coated with the catalyst only on the side thereof facing the reaction path.

The reactor functions as follows:

The processed fluid, e.g., outgoing air, is delivered to the reactor through the inlet 39 and is conducted into the reaction space 31. There, the fluid is subjected to the already described catalytic reaction in the region 36 and is carried away through the outlet 40. Dependent upon whether strong exothermal or strong endothermal catalysis takes place, cooling or heating medium is conducted through the channels 34 arranged adjacent to the respective reaction spaces. This results in heat being supplied into or carried away from the reaction space 31. Thereby, the catalytic reaction is balanced. The regions 37 and 38 form, in this embodiment, already mentioned heating or cooling zones for the fluid.

Figure 6:
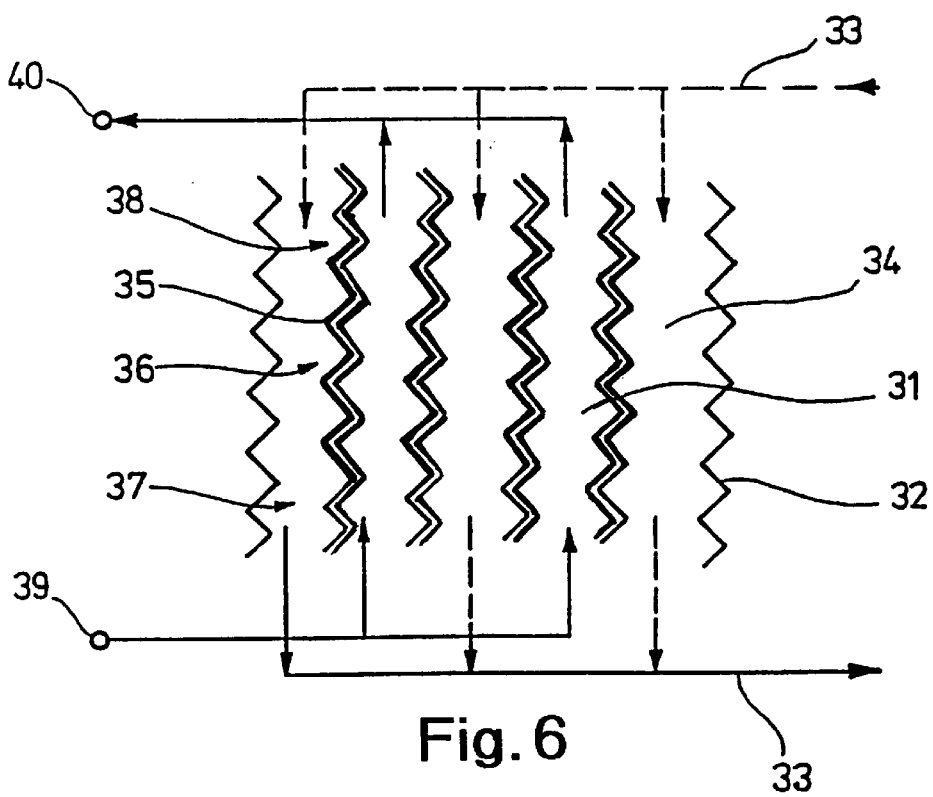
FIG. 6 is a schematic view of a further reactor with heating and cooling channels according to the present invention.

FIG. 6 shows an embodiment of a reactor according to the present invention in which the regions 37 and 38 are also coated with a catalyst, so that the plates 32 are coated with the catalyst 35 along their entire length. The required cooling or heating is then provided by the medium that flows through the channels 34.

Figure 7:
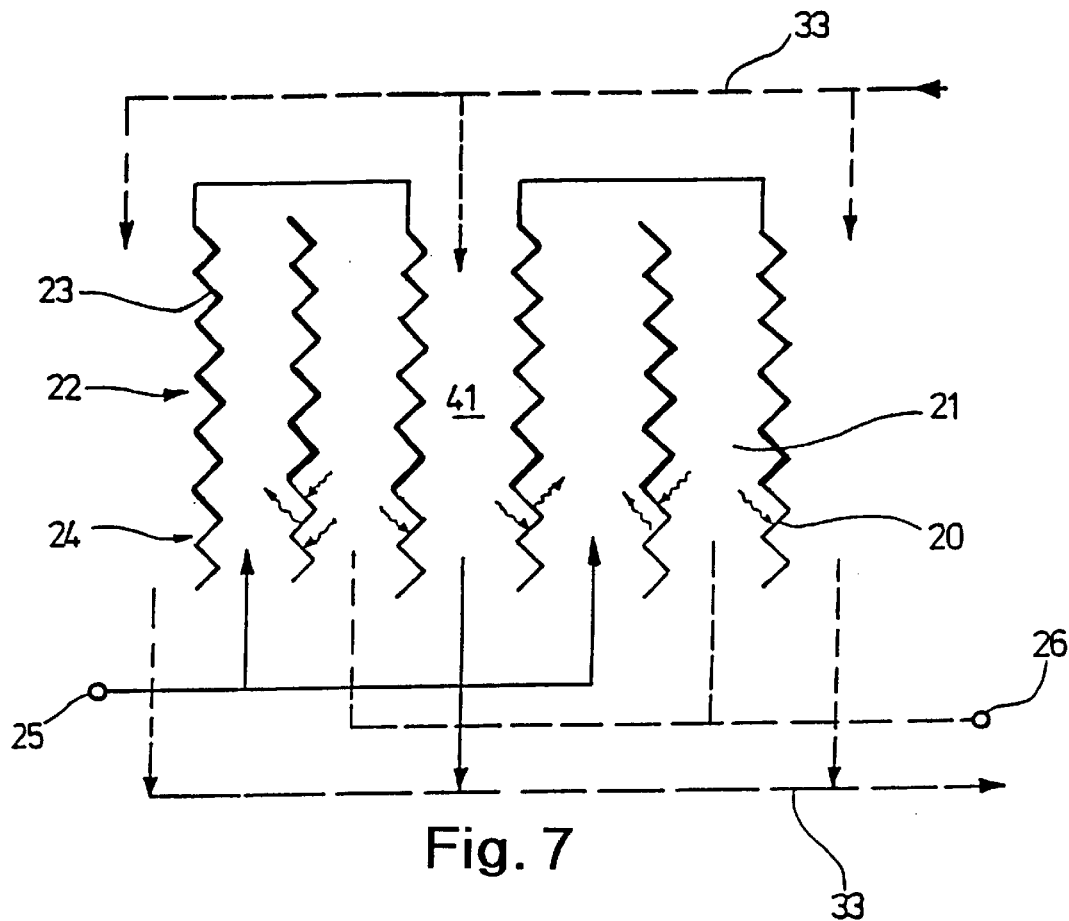
FIG. 7 is a schematic view of yet a further reactor with additional heating and cooling channels according to the present invention.

Another embodiment of the reactor is shown in FIG. 7. Here, the construction shown in FIG. 2 is combined with a cooling or heating circuit 33. Thus, it is possible to use a longest possible reaction path and thereby to extract additional heat or to add additional heat, if needed. The processed fluid enters the reactor through the inlet 25 and exits the reactor through the outlet 26. The heating or cooling medium, which circulates in the heating or cooling system 33 flows past the end plates 20 of the two reaction zones of the reactor and through an intermediate channel 41 provided between the two reaction zones.

Figure 8:
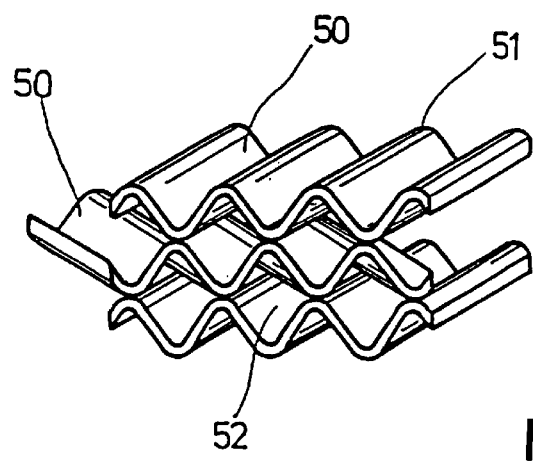
FIG. 8 is a variant of a plate arrangement.
Figure 9:
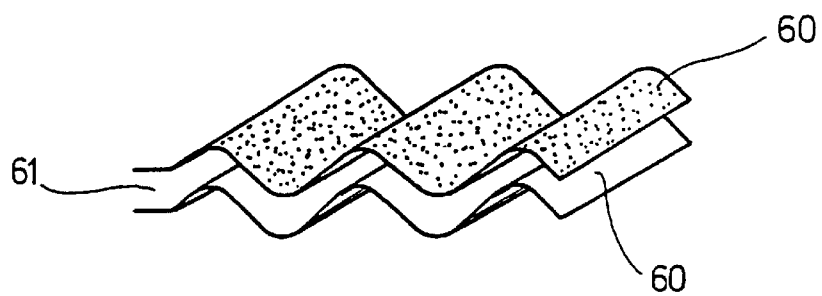
FIG. 9 is a further variant of the plate arrangment.
Figure 10:
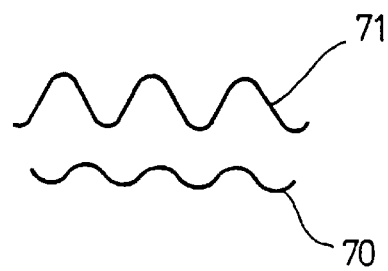
FIG. 10 is a variant of a plate construction.

FIGS. 8–10 show different plate arrangements which do not depend on general construction of the reactor.

FIG. 8 shows a perspective view of a plate arrangement according to one of the embodiments of the present invention. In FIG. 8 the plates 50 are arranged in such a manner that the corrugation of the adjacent plates, arranged one above they other, extend at an angle. The plates 50 are supported here on their crests 51, which define the corrugated structure. Such an optimal support simultaneously provides for good stability, even with very thin-walled plates because the thin walls insure good heat conductivity, an optimal construction is thereby obtained.

The plates 50 form channels 52. The channel 52, because of the crests 51, do not extend at the same level. These obstructions lead to an increased turbulence in the fluid stream and/or in the stream of cooling or heating medium and, as a result, a better performance of the whole apparatus is achieved.

Figure 13:
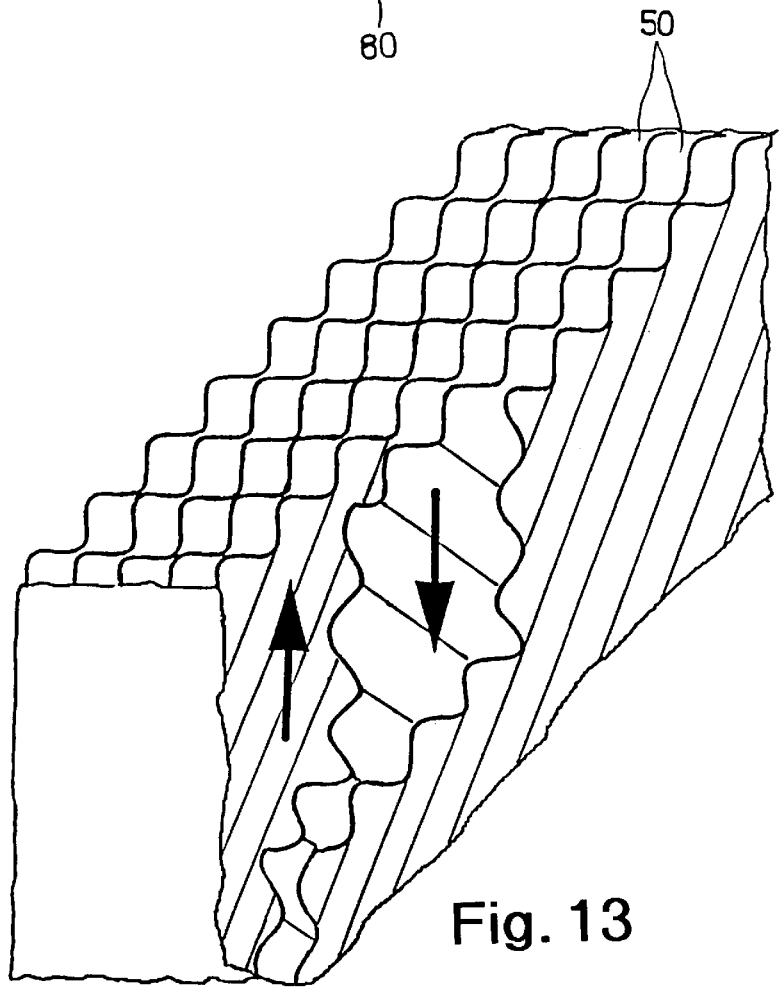
FIG. 13 shows a partial perspective view of a reactor according to the present invention with plate arrangement according to FIG. 8.

While in the shown arrangement, the plate corrugations of the adjacent plates are arranged at an angle of about 90°, in effect any displacement angle between 0° and 90° can be used. A portion of a reactor with the alternating arrangement of plates 50 is shown in FIG. 13.

Further, as FIG. 9 shows, it is possible to arrange the corrugated structures so that the plates extend parallel to each other. The plates 60 are so arranged that they form a through channel 61. Between the plates, there are provided additional supports (not shown).

As further shown in FIG. 10, it is advantageous when the plates 70 and 71 have a different shape and differ from each other in height and form corrugated structures with a different spacing between corrugation.

Figure 11:
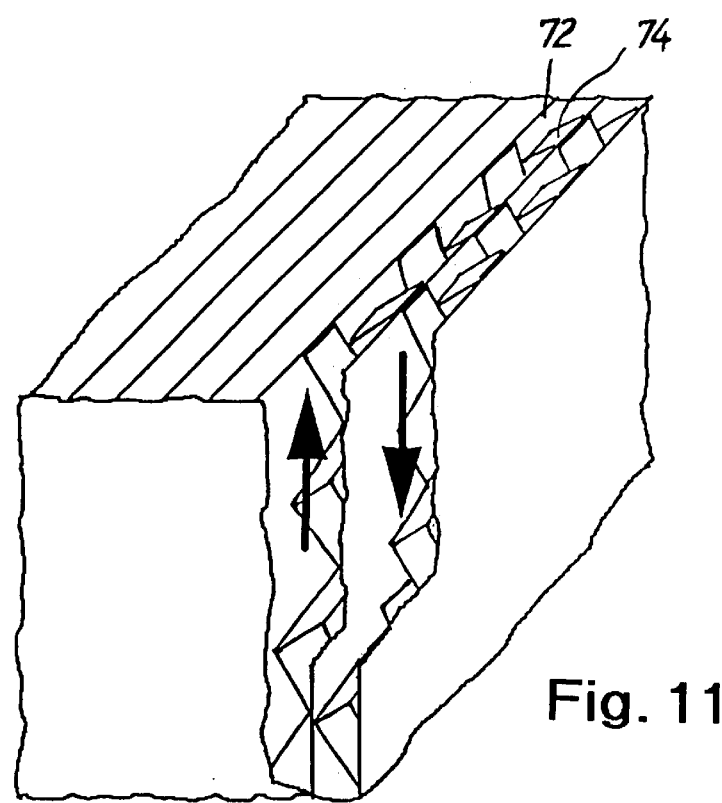
FIG. 11 is a partial perspective view of a reactor according to the present invention showing applying a catalyst to an inner structure.

FIG. 11 shows an embodiment of a reactor, in which the the channels through which the processed fluid flows are formed by spaced from each other flat plates 72, with the catalyst being provided on corrugated strips or plates 74 inserted in the channels.

Figure 12:
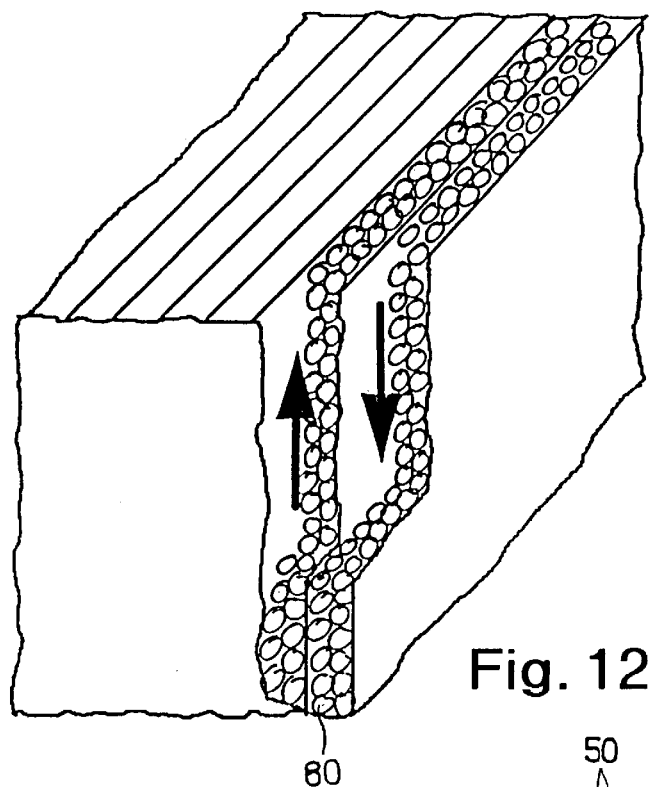
FIG. 12 shows a partial perspective view of a reactor according to the present invention with fluid channels being filled with a bulk catalyst.

FIG. 12 shows a reactor in which catalyst 80 is provided in bulk in the channels through which fluid flows.

It is also within the scope of the invention, when the shown catalyst regions are not continuously provided with a catalyst, coated therewith, but also have catalyst-free regions. Thereby, a more precise heating during conducting the entire process is possible.

Generally, it is possible to provide the fluid paths with a catalyst in any arbitrary manner. For example, the coating of the walls with a catalyst mass can be eliminated and instead, a catalyst-covered structure, for example, a grid, can be provided in the fluid path.

What is claimed is:

1. A reactor for catalytically processing gaseous fluids, comprising:

at least three fluid-path forming elements spaced from each other and forming a pair of adjacent first and second channels through which fluid flows in opposite directions, each of said first and second channels having an inlet region and an outlet region, wherein at least the inlet region of the first channel and the outlet region of the second channel are without a catalyst, wherein each of said first and second channels has a region other than the inlet and outlet regions thereof provided with a catalyst, and wherein at least the inlet region of the first channel and at least the outlet region of the second channel means provide for heat exchange between said first and second channels; and means for feeding fluid to the inlet region of said first channel and for discharging the fluid from the outlet region of said second channel.

2. A reactor according to claim 1, wherein the fluid-path forming elements are formed as corrugated plates.

3. A reactor according to claim 1, wherein the fluid—path forming elements are formed as plates extending substantially parallel to each other.

4. A reactor according to claim 1, wherein the at least three fluid-path forming elements comprise more than three fluid-path forming elements sufficient to form a plurality of pairs of adjacent first and second channels to which fluid flows in opposite directions, and in which at least the inlet region of all of the first channels and the outlet regions of all of the second channels are without catalyst, and each of all of the first and second channels has a region other than the inlet and outlet regions thereof provided with the catalyst, and wherein all of the fluid-forming elements are formed as plates extending substantially parallel to each other.

5. A reactor according to claim 4, further comprising a collecting channel, wherein the outlet regions of the first channels and the inlet regions of the second channels are connected with the collecting channel.

6. A reactor according to claim 5, further comprising heat take-off means communicating with the collecting channel.

7. A reactor according to claim 5, further comprising pre-heating means connected with the collecting channel.

8. A reactor according to claim 1, further comprising pre-heating means located upstream of the inlet region of the first channel and downstream of the feeding means.

9. A reactor according to claim 3, wherein the plates have a wave structure, and wherein adjacent plates are arranged so that the waves extend at an angle to each other.

10. A reactor according to claim 4, wherein the fluid-path forming elements are formed as corrugated plates.

11. A reactor according to claim 1, wherein the catalyst is provided in bulk.

12. A reactor according to claim 4, wherein the plurality of pairs of adjacent first and second channels comprises at least two pairs of adjacent first and second channels, wherein one pair of adjacent first and second channels is spaced from the other pair of adjacent first and second channels, and wherein a space between the two pairs of adjacent first and second channels defines a through-channel which forms part of a heat transfer circuit and through which a heat transfer medium.

13. A reactor according to claim 12, wherein the fluid-path forming elements are formed as plates, and wherein additional channels are provided outside of the two pairs of adjacent first and second channels remote from the through-channel, said additional channels forming part of the heat transfer circuit and through which the heat transfer medium flows.

* * * * *